(No Model.)
L. BERTSCHE & A. ORTNER.
FENDER FOR CARS.
No. 463,438. Patented Nov. 17, 1891.
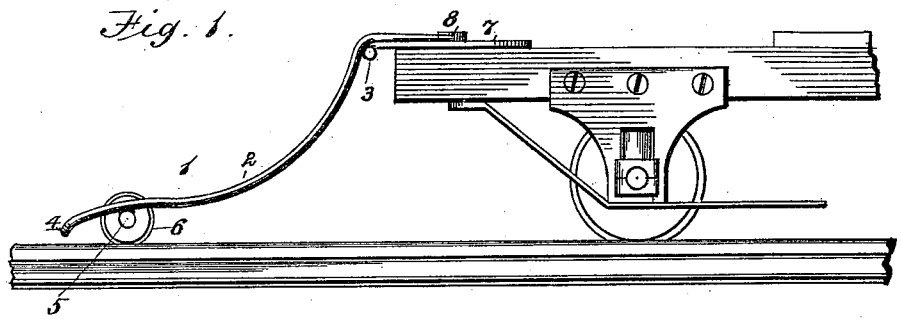
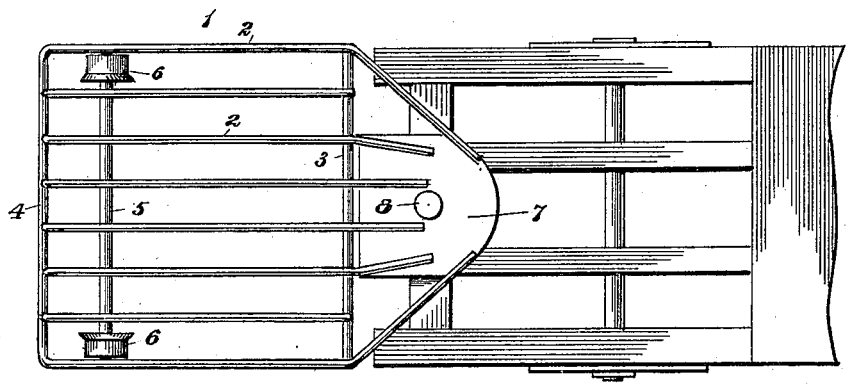
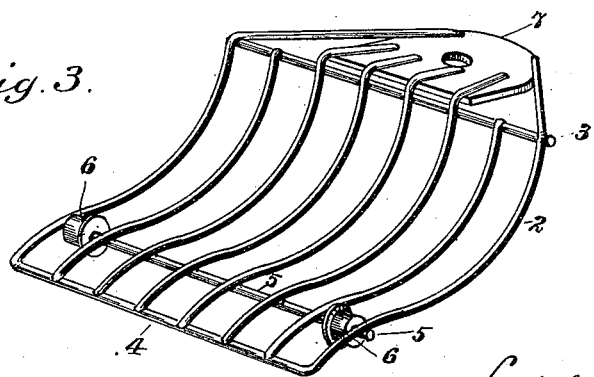
Witnesses
Wm. H. N. Knight.
N. F. Bernhard
Inventors:
Leopold Bertsche and
Alexander Ortner
By their Attorneys,
Edson Bro's.

UNITED STATES PATENT OFFICE.

LEOPOLD BERTSCHE AND ALEXANDER ORTNER, OF PITTSBURG, PENNSYLVANIA.

FENDER FOR CARS.

SPECIFICATION forming part of Letters Patent No. 463,438, dated November 17, 1891.

Application filed July 13, 1891. Serial No. 399,338. (No model.)

*To all whom it may concern:*

Be it known that we, LEOPOLD BERTSCHE and ALEXANDER ORTNER, citizens of the United States, residents of Pittsburg, in the county of Allegheny and State of Pennsylvania, have invented certain new and useful Improvements in Fenders for Cars; and we do hereby declare the following to be a full, clear, and exact description of the invention, such as will enable others skilled in the art to which it appertains to make and use the same.

Our invention relates to improvements in guards or fenders adapted for use on electric or cable street-railway cars and for locomotives; and the object is to provide an improved fender of simple and inexpensive construction adapted to be supported or journaled on the rails of a track to be guided horizontally thereon in rounding a curve.

With these and other ends in view our invention consists of the peculiar construction and arrangement of parts, as will more fully appear hereinafter.

In the accompanying drawings, Figure 1 is a side elevation showing a portion of a car-truck and a track with our improved guard adapted for use in connection with railways. Fig. 2 is a plan view, and Fig. 3 is a detailed perspective, of the guard disconnected from the truck.

Referring to the drawings, in which like numerals of reference denote corresponding parts in all the figures, 1 designates the improved guard or fender as an entirety, which consists of the curved longitudinal bars 2, a rear transverse bar 3, a front transverse bar 4, an axle 5, the friction rollers or wheels 6, and the pivotal plate 7, through which the vertical king-bolt 8 passes. The rear transverse bar is arranged in front of the pivotal plate, and to this rear bar is united the rear ends of the longitudinal curved bars 2. The middle and side bars 2 of the fender are extended beyond or in rear of the bar 3, and said rear ends of the bars 2 are rigidly united to the pivotal plate 7 in any suitable manner. The longitudinal bars are curved downwardly from the rear transverse bar 3 toward the axle 5, and from the axle the bars curve reversely and downwardly toward the front bar 4, to which the ends are rigidly secured. This construction and arrangement of the several parts form a very light and substantial fender, and as the weight of the fender is supported primarily by the friction rollers or wheels it will be seen that the single king-bolt is relieved of undue strain.

The axle 5 is rigidly secured to the longitudinal bars 2 by suitable means, and it serves as an intermediate brace to the longitudinal bars of the fender as well as the support or journal for the friction-wheels. These wheels are fitted on the axle between two adjacent bars 2 and the fender, and they project sufficiently below the front end of the fender to rest on the track and at the same time keep the fender out of contact with the track. These friction-wheels are provided with flanges on their inner approximate end, which flanges are designed to bear against the inner sides of the rails and thereby retain the fender in its proper position from the track and to guide or turn the fender in the direction of the track, which is very desirable in rounding a curve.

The king-bolt 8 passes through the pivotal plate and into one of the transverse beams of the car-truck; but this particular connection is not essential, as the fender may be pivoted by the bolt to the under side of a street-car body.

The operation of our invention is as follows: The weight of the fender is sustained by the friction rollers or wheels and the bolt permits the fender to swing or turn a limited distance horizontally sufficient for the fender to accommodate itself to the curve or line of the car-track.

We are aware that changes in the form and proportion of parts and details of construction can be made without departing from the spirit or sacrificing the advantages of our invention.

What we claim, and desire to secure by Letters Patent, is—

1. A car-fender consisting, essentially, of the longitudinal curved bars which are rigidly united at their ends by suitable transverse means, an axle carried by the fender near its lower end, and the wheels journaled on said axle, substantially as described.

2. A car-fender consisting of the longitudinal curved bars, the transverse bars rigid with the longitudinal bars, a pivotal plate fastened to the rear end of the fender, an axle rigid with the longitudinal bars of the fender and arranged in rear of the front bar thereof, and the flanged friction-rollers united on said axle between the longitudinal bars, substantially as described.

In testimony whereof we affix our signatures in presence of two witnesses.

LEOPOLD BERTSCHE.
ALEXANDER ORTNER.

Witnesses:
GEO. F. ECKHARDT,
WM. HENNING.